Figure 1:
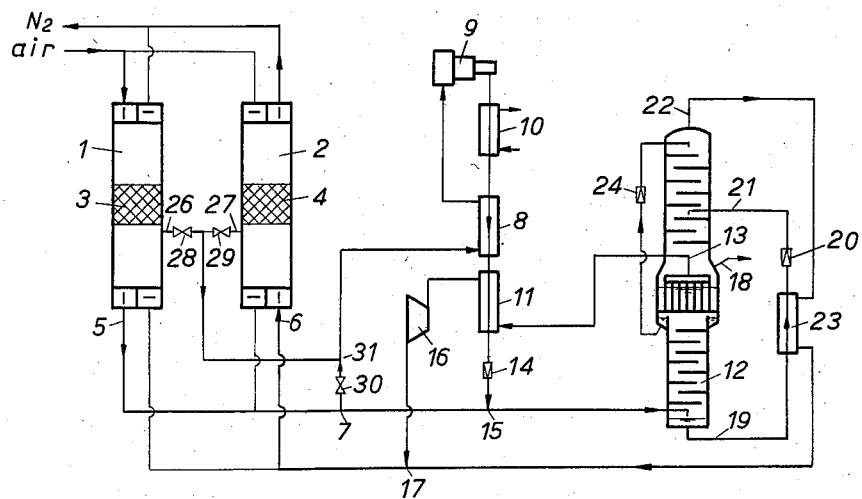

March 4, 1958 R. LINDE 2,825,212
PROCESS FOR SEPARATING A COMPRESSED GAS MIXTURE
Filed May 20, 1955

2,825,212

PROCESS FOR SEPARATING A COMPRESSED GAS MIXTURE

Richard Linde, Munich-Solln, Germany, assignor to Gesellschaft fur Linde's Eismaschinen Aktiengesellschaft, Munich, Germany Application May 20, 1955, Serial No. 509,728
In Germany March 25, 1950

Public Law 619, August 23, 1954
Patent expires March 25, 1970

7 Claims. (Cl. 62—175.5)

The present invention relates to a process for separating a compressed gas mixture.

In the separation of a gas mixture by pressure and cooling, the separation of the mixture is preceded by the process steps of purification and cooling. The steps of cooling and purification are simultaneously carried out in cold accumulators, which are adapted to be changed over, or a counter-current heat-exchanger of interchangeable cross-section. The re-vaporisation of separated condensates at the cold end of the heat-exchangers is impeded if equal quantities of the hot, unseparated gas mixture and the cold separation products are fed to the exchangers. The reason for this is that the compressed gas mixture especially at low temperatures, has a substantially greater specific heat than the uncompressed products of separation. Consequently, the temperature difference between the products of equal weight entering and leaving the exchangers is substantially greater at the cold ends than at the other parts of the exchangers. Thus, the re-vaporisation of separated condensates is impeded even if the ratio between the volumes of the gases entering and leaving is that which is required in order to effect re-vaporisation at medium or high temperature. In the art of gas separation this is remedied in various ways, for example by not introducing part of the gas mixture to be separated through the cold accumulators, and by discharging its products of separation through the accumulators. One example of such a method is the high-pressure Linde-Frankl process of air separation. The air is not introduced through the cold accumulators, but one part of its products of separation passes out through the regenerators. However, the temperature difference between the air and the separation products at the warm end of the regenerators then increases, which causes cold losses. Another known method resides in feeding the whole of the gas mixture to be separated to the heat-exchangers, in branching off an incompletely purified, cooled part before it reaches the coldest zone of the exchangers, and in completely cooling and purifying this part in counter-current heat exchange with the cold gas mixture. The refrigerated impurities are deposited in one counter-current heat-exchanger and the exchanger is freed from the deposits by heating. Meanwhile, the branched-off gas current is cooled and purified in a second counter-current exchanger. These counter-current exchangers are large and costly and frequent changing thereof is necessary. Furthermore, the temperature of the gas current cooled therein fluctuates like that of the component current, to the detriment of its further use.

According to the present invention there is provided a process for separating compressed gas mixtures comprising the steps of successively contacting the gas mixture with an adsorption medium in cold accumulators, to free said mixture practically completely from impurities dividing the mixture into a main stream and a partial stream, completely cooling the main stream in the cold accumulators, heating the partial stream in counter-current with itself to approximately ambient temperature, compressing said partial stream, re-cooling the latter in heat-exchange with itself after dissipation of the heat of compression, delivering said partial stream to a counter-current heat-exchanger to partially heat the separation products, separating both streams in a suitable separation apparatus, and reheating the separation products in the cold accumulators to desorb the adsorption medium. The partial gas stream can be withdrawn beyond a section of the regenerator or beyond the adsorbent situated therein, at a higher temperature. However, it is also possible to withdraw the partial gas stream at the cold ends of the heat exchangers, because the compressed partial gas stream is cooled in exchange with itself, that is to say, with the partial gas stream not yet compressed, only to the temperature at which its condensation commences. Thus the gas to be expanded is heated in exchange with the compressed partial gas stream to a temperature in the neighbourhood of the condensation temperature of the latter, which in the case of air at 30 atm. pressure is about 127° K. The gas at the heat-exchange outlets in the case of the separation of air has an average temperature of, for example, about 100° K. In order to regulate the temperature of the gas to be expanded, part of the partial gas stream can be branched off at the cold ends of the heat-exchangers and another regulatable part can be branched off immediately after passing through a part of the heat-exchangers.

Figure 2:
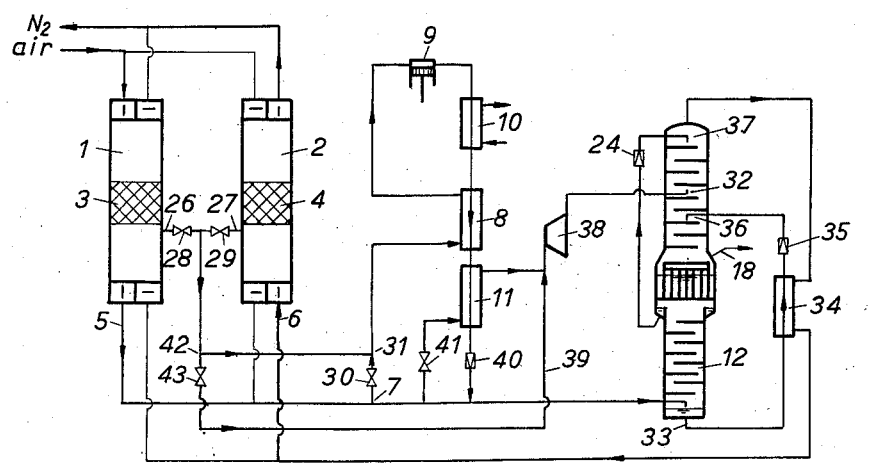

For a better understanding of the invention, and to show how the same is to be carried into effect, reference will now be made to the accompanying drawings in which:

Figure 1 shows diagrammatically one constructional form of a two-stage air separation apparatus, and Figure 2 is a diagrammatic representation of another constructional form similar to that of Figure 1.

Referring firstly to Figure 1, a partial air stream is employed to heat compressed nitrogen which is taken from the pressure column of a separating apparatus and expanded in a turbine whilst performing work. Compressed air is cooled in a regenerator 1 and, after flowing through a layer of adsorbent 3 arranged in the regenerator is introduced beyond 5 into the pressure column of an air-separating apparatus. One part of a partial air stream is branched off at 26 through a valve 28 and another part at 7 through a valve 30, the two parts being combined at 31. The partial air stream is heated in exchange with itself in a counter-current apparatus 8 and compressed in a compressor 9. After dissipation of the heat of its compression in a cooler 10 and re-cooling in the counter-current apparatus 8 the partial stream is condensed in a counter-current heat exchanger 11 in indirect exchange with cold nitrogen taken from the head of a pressure column 12 at 13. The condensate is expanded through a valve 14 and combined with the main air stream at 15, the combined streams being introduced into the pressure column 12. The nitrogen which is re-heated to a certain extent in the counter-current heat exchanger 11 is expanded in the expansion turbine 16 whilst performing work and combined at 17 with the nitrogen coming from the upper column 25. The combined nitrogen stream is led out through the regenerator 2. Oxygen is withdrawn at 18 from the upper column 25 and heated in the usual manner with utilisation of its cold content in two regenerators (not shown) by a part of the fresh air to be separated. The upper column 25 is charged with liquid rich in oxygen through a duct 19, a valve 20 and a duct 21, the liquid being cooled to low temperatures by the nitrogen escaping at 22 to a counter-current heat-exchanger 23. The liquefied compressed nitrogen is expanded into the upper column 25 through a valve 24. The regenerators are periodically changed over in the usual manner. After a change-over, the fresh air flows into the regenerator 2 and a partial air stream can be withdrawn at 27 through a valve 29, whilst the nitrogen passes through the regenerator 1 into the atmosphere.

If the cold required for the separating process is not produced by expansion of compressed nitrogen, but by expansion of air leaving the regenerator, then, in accordance with a further development of the invention, the partial stream branched from the regenerator can be brought into heat exchange with the colder air which is to be expanded whilst performing work, after being heated and compressed, and is thus cooled to low temperatures and liquefied. The entirely or partially liquefied air is then expanded to the pressure of the pressure column of the two-stage air-separating arrangement and introduced into this column.

The manner in which this process is carried out is illustrated in Figure 2, the references of which are the same as those in Figure 1 in so far as they relate to the same parts. Air is introduced into the regenerator 1 in the case illustrated. After flowing through a layer of adsorbent 3, the air leaves the regenerator 1 at 5 and is for the greater part introduced into the pressure column 12 of the air-separating apparatus. One part of a partial stream is branched off at 26 through a valve 28 and another at 7 through a valve 30, and the two parts of the divided stream are joined at 31. The partial stream is heated in a counter-current heat exchanger 8, compressed in a compressor 9 and re-cooled in a counter-current heat exchanger 8 after dissipation of the heat of compression in a cooler 10. In the counter-current heat exchanger 11, the air is brought into cold exchange with a part, guided through a valve 41, of the main stream coming from the regenerator 1, and is thus entirely or partially liquefied. The condensate is introduced through the valve 40 into the pressure column 12. The main stream is expanded in an expansion turbine 38 and introduced at 32 into the upper column 25. After changeover of the regenerators 1 and 2, the compressed air is introduced into the regenerator 2 and flows through the adsorber 4, and the partial stream can be withdrawn at 27 through the valve 29.

The manner of operation of the arrangement is in other respects the same as usual, that is to say, the liquid rich in oxygen which is produced in the pressure column is withdrawn from the sump of this column at 33 and, after cooling to low temperatures in a counter-current heat exchanger 34 in exchange with the first product of separation (nitrogen). The latter is expanded from the upper column through a valve 35 and introduced into the upper column 25 at 36. The liquid nitrogen collected in the condenser of the pressure column 12 is expanded through the valve 24 and charged in liquid form to the head of the upper column at 37. The escaping nitrogen then passes through a counter-current exchanger 34 and the regenerator 2 into the atmosphere. After the change-over of the regenerators, the nitrogen is led out through the regenerator 1. The second product of separation (oxygen) is withdrawn at 18 and heated in regenerators (not shown) in exchange with a further part of the air and discharged. The regenerators may also be replaced by counter-current heat exchangers which are adapted to be changed over. A portion of the partial stream diverted at 26 can be branched off at 42 and guided through a valve 43 and a duct 39 directly to an expansion turbine 38.

I claim:

1. A process for the separation of a compressed gas mixture, comprising the steps of partially cooling said mixture in indirect heat-exchange with the products obtained by the separation of said mixture, thereby to remove water from the compressed gases by condensation, removing remaining gaseous impurities from the partially cooled gases in contact with an adsorption material, withdrawing part of said mixture from the indirect heat-exchange after the adsorption of said impurities, reheating said part at approximately ambient temperature, compressing the reheated gases, recooling the compressed reheated gases to about the temperature of said part on leaving the indirect heat-exchange, further cooling said part in gaseous heat exchange thereby to partially liquefy the same, expanding the partially liquefied gases, further cooling the remainder of the compressed purified gas mixture in further indirect heat-exchange with the separation products of said compressed gas mixtures, and feeding both the fully cooled gases and the liquefied expanded part of said gas mixture to a two-stage separator for said mixture.

2. A process according to claim 1, and further comprising the steps of using a portion of the separation product from said separator to effect the further cooling of said part thereby to liquefy the same, expanding the partially reheated separation products used in this liquefaction stage, combining the expanded portion of the separated products with further portions of the latter for the cooling of the incoming compressed gas mixture in the indirect heat-exchange and feeding both parts of said mixture to the high-pressure stage of said separator.

3. A process according to claim 2, wherein the compressed gas mixture to be liquefied consists essentially of air, and the separation products consist essentially of nitrogen and oxygen, and further comprising the steps of withdrawing nitrogen at the top of the high pressure stage of said separator, using the withdrawn nitrogen for the further cooling of the compressed cooled part of the air mixture to liquefy the same, expanding the resulting partially reheated nitrogen, combining the expanded nitrogen with cold nitrogen from the low pressure stage of said separator and supplying the combined nitrogen for the cooling of the incoming compressed air mixture in said indirect heat-exchangers.

4. A process according to claim 1 and further comprising the step of diverting a portion of the fully cooled remainder of said compressed mixture to the partially cooled part of said mixture before the reheating of the latter part in the proportion required by the heat balance of the separation.

5. A process acording to claim 1 and further comprising the steps of diverting a portion of the fully cooled remainder of said mixture prior to the feeding of said remainder to the separation stage, using the diverted portion of said remainder for the further cooling of the compressed recooled part of said mixture thereby to partially liquefy the latter, and expanding the resulting partially reheated gases of said remainder before supplying the latter gases to the low-pressure stage of said separator.

6. A process according to claim 5 and further comprising steps of diverting a portion of the partially cooled gases of said part leaving the indirect heat exchange, and combining said portion with the reheated gases of said remainder before the expansion of the latter.

7. A process according to claim 5, wherein the gas mixture to be separated consists essentially of air and the separation products consist essentially of nitrogen and oxygen.

References Cited in the file of this patent

UNITED STATES PATENTS 2,584,381   Dodge _____ Feb. 5, 1952

FOREIGN PATENTS 373,918   Great Britain _____ June 2, 1932
497,662   Belgium _____ Feb. 19, 1951
  (Corresponding U. S., 2,699,047, Jan. 11, 1955)